US009705382B2

(12) United States Patent
Morgan et al.

(10) Patent No.: US 9,705,382 B2
(45) Date of Patent: Jul. 11, 2017

(54) ELECTRICITY GENERATION DEVICE AND METHOD EMPLOYING CRYOGENIC FLUID, EVAPORATOR, SUPERHEATER, AND EXPANSION TURBINE

(75) Inventors: Robert Morgan, Shoreham by Sea (GB); Stephen Gareth Brett, Reading (GB)

(73) Assignee: Highview Enterprises Limited (GB)

( * ) Notice: Subject to any disclaimer, the term of this patent is extended or adjusted under 35 U.S.C. 154(b) by 86 days.

(21) Appl. No.: 13/979,355

(22) PCT Filed: Jan. 13, 2012

(86) PCT No.: PCT/GB2012/000031
§ 371 (c)(1),
(2), (4) Date: Sep. 30, 2013

(87) PCT Pub. No.: WO2012/095636
PCT Pub. Date: Jul. 19, 2012

(65) Prior Publication Data
US 2014/0217739 A1 Aug. 7, 2014

(30) Foreign Application Priority Data

Jan. 13, 2011 (GB) .................................. 1100569.1

(51) Int. Cl.
*F01K 23/06* (2006.01)
*F01K 25/10* (2006.01)
(Continued)

(52) U.S. Cl.
CPC ........... *H02K 7/1823* (2013.01); *F01D 15/10* (2013.01); *F01K 7/22* (2013.01); *F01K 23/064* (2013.01);
(Continued)

(58) Field of Classification Search
CPC ..................... F01K 25/08; F01K 25/10; F01K 23/00–23/106; F01K 25/06; F01K 25/14
(Continued)

(56) References Cited

U.S. PATENT DOCUMENTS 3,214,938 A    11/1965  Zotos
3,998,059 A *  12/1976  Randell .......................... 60/659
(Continued)

FOREIGN PATENT DOCUMENTS

| JP | 08189457 A * | 7/1996 |
| JP | 3696931 B2 | 9/2005 |
| WO | 2007028221 A2 | 3/2007 |
| WO | 2007096656 A1 | 8/2007 |

OTHER PUBLICATIONS

International Preliminary Report on Patentability in corresponding PCT/GB2012/000031, dated Jul. 16, 2013 10 pages.

*Primary Examiner* — Laert Dounis
(74) *Attorney, Agent, or Firm* — Andrew J. Anderson, Esq.; Harter Secrest & Emery LLP

(57) ABSTRACT

There is disclosed a device and method for the generation of zero emission electricity that can be used to provide load balancing and emergency support to a electricity distribution network or back up electricity to a critical consumer such as a hospital or data center. The system uses a cryogenic fluid and a source of low grade waste heat. A cryogenic fluid is first evaporated by an evaporator (3) heated by a superheater (4) before entering an expansion turbine (10) to produce electricity.

16 Claims, 3 Drawing Sheets

(51) Int. Cl.
*H02K 7/18* (2006.01)
*F01D 15/10* (2006.01)
*F02C 1/04* (2006.01)
*F02C 6/00* (2006.01)
*F02C 6/14* (2006.01)
*F02C 6/18* (2006.01)
*F01K 7/22* (2006.01)

(52) U.S. Cl.
CPC ............. *F01K 25/10* (2013.01); *F02C 1/04* (2013.01); *F02C 6/003* (2013.01); *F02C 6/14* (2013.01); *F02C 6/18* (2013.01); *F05D 2260/205* (2013.01); *Y02E 20/14* (2013.01); *Y02E 50/11* (2013.01); *Y02E 50/12* (2013.01)

(58) Field of Classification Search
USPC .......................................... 60/651, 659, 671
See application file for complete search history.

(56) References Cited

U.S. PATENT DOCUMENTS

| | | | | |
|---|---|---|---|---|
| 4,215,553 | A * | 8/1980 | Poirier | F02C 1/05 165/104.34 |
| 7,047,744 | B1 * | 5/2006 | Robertson et al. | 60/670 |
| 7,305,832 | B2 * | 12/2007 | Fletcher | F02C 6/16 60/39.511 |
| 2003/0093995 | A1 * | 5/2003 | Tadayon et al. | 60/651 |
| 2006/0174622 | A1 * | 8/2006 | Skowronski | F01K 23/10 60/641.8 |
| 2007/0163261 | A1 * | 7/2007 | Strathman | 60/651 |
| 2009/0293502 | A1 * | 12/2009 | Vandor | F25J 1/0204 62/45.1 |
| 2012/0255312 | A1 * | 10/2012 | Rajaraman | F01K 21/04 62/6 |
| 2013/0213040 | A1 * | 8/2013 | Goswami et al. | 60/647 |

* cited by examiner

ELECTRICITY GENERATION DEVICE AND METHOD EMPLOYING CRYOGENIC FLUID, EVAPORATOR, SUPERHEATER, AND EXPANSION TURBINE

FIELD OF THE INVENTION

The present invention relates to electricity generation devices and methods that use a cryogenic fluid such as liquid nitrogen or liquid air and a source of low grade waste heat.

BACKGROUND OF THE INVENTION

Electricity distribution networks (or grids) are often supported by a fleet of diesel generators and open cycle gas turbines that provide electricity during periods of high demand and emergency events such as the unexpected failure of a power station. Such generating assets, often referred to as peaking plant, burn fossil fuels at low efficiency and can be a significant source of atmospheric pollutants. The services provided by such peaking plant, include, but are not limited to,
- balancing differences in supply and demand at different times of the day and at short notice,
- providing electricity required to power the auxiliary equipment required for restart of a generating asset in the event of total network failure (black-start support),
- network reinforcement where parts of the electricity distribution network have a shortfall in capacity during periods of high power demand,
- injecting power into the network to support the frequency of the grid when demand for electricity increases rapidly.

In addition, the loss of power from the electricity distribution network can result in significant economic loss to some consumers, such as a data centre, or danger to personnel, for example in the event of a power failure at a hospital. Such applications often utilise diesel generators to provide standby electricity in the event of an interruption to the supply of electricity from the distribution network. Replacement of such diesel powered generators with a zero emissions device that uses a fuel from a sustainable source would be of benefit.

There is a need for a device that can provide a similar service but that uses a fuel that produces low or preferably zero atmospheric pollution that originates from a sustainable source.

The present inventors have realised that there is potential to generate electricity using the expansion of liquid air, liquid nitrogen or cryogen to drive a turbine to generate electricity. Such a device could provide a compact, reactive and environmentally clean solution to the problems of balancing network supply with demand.

WO 2007/096656 discloses a cryogenic energy storage system which exploits the temperature and phase differential between low temperature liquid air, liquid nitrogen or cryogen, and ambient air, or waste heat, to store energy at periods of low demand and/or excess production, allowing this stored energy to be released later to generate electricity during periods of high demand and/or constrained output. The system comprises a means for liquefying air during periods of low electricity demand, a means for storing the liquid air produced and an expansion turbine for expanding the liquid air. The expansion turbine is connected to a generator to generate electricity when required to meet shortfalls between supply and demand. The target applications for the present invention require a very low number of operating hours per year, typically less than 500 and in the case of back-up power applications, much less. It would be uneconomic to install a complete energy storage system to service such applications due to the low utilisation of the air liquefier equipment and relatively high cost of this equipment for such a low level of utilisation.

PCT/BR2006/000177 discloses a device for generating power from liquid air which utilises ambient heat to provide thermal energy for the evaporation process. The inventors believe that this solution is impractical as a very large area of heat transfer surface would be required to prevent the build-up of excessive ice on the evaporator during the evaporation of the cold cryogenic fluid.

SUMMARY OF THE INVENTION

The present invention provides a device and method as recited in the claims, for the generation of zero emission electricity that can be used to provide load balancing and emergency support to an electricity distribution network, or back up power to a critical consumer such as a hospital or data centre. The system uses a cryogenic fluid and a source of low grade waste heat.

The present invention relates to electricity generation systems or 'cryogensets' and methods that use a cryogenic fluid such as liquid nitrogen or liquid air and a source of low grade waste heat.

The present invention, referred to as the 'cryogenset', develops the power recovery element of the prior art cited above to provide a compact, clean, reactive and efficient electricity generation device and method of generating electricity, which uses liquid air, liquid nitrogen or cryogen as the working fluid. The working fluid is supplied by a central plant that could service more than one cryogenset and other users of cryogen and hence achieve a viable economic level of utilisation for the liquefier.

The present invention utilises a cryogenic fluid, such as liquid nitrogen or liquid air, and a source of low grade waste heat to power a turbo-generator. The emissions from the device are either gaseous nitrogen or gaseous air and present no environmental concerns. The cryogenic fluid is manufactured in an industrial refrigeration or air separation plant and supplied by tanker or pipeline to the cryogenset preferably via a storage tank. The industrial refrigeration plant can be powered by a sustainable source of energy, such as a wind turbine farm or a solar plant, or by a low carbon source such as a nuclear power station. In this way, the fuel consumed in the cryogenset is from a sustainable source. FIG. 1 shows the cryogenset in relation to the heat source, liquefier and end user.

The cryogenset is powered by the expansion of a high pressure gas through an expansion turbine, which in turn drives a generator to produce electricity. The high pressure gas is generated by a first compression of a cryogenic fluid, typically air or nitrogen, in a pump, followed by evaporation of the cryogenic fluid within an evaporator. In systems not according to the present invention, evaporation of the cryogenic fluid uses ambient heat alone and requires a large number of ambient vaporisers. Such vaporisers are typically constructed from a finned tube through which the cryogenic fluid passes. Heat is transferred through the fins to the ambient environment. In such systems, the fins and tubes must not be positioned too close together or excessive ice will build up on the fins resulting in a degradation of performance and potentially mechanical damage to the equipment due to the weight of the ice. This problem is particularly relevant to, and is addressed by, the cryogenset of the present invention, as a large quantity of cryogenic fluid must be heated in a short space of time.

In the present invention, the cryogenic fluid is first evaporated using the low pressure exhaust gases from the expansion turbine. The consequentially high-pressure cold gas is further heated using a superheater that takes thermal energy from a source of low grade waste heat, such as a thermal power station or industrial process. The combination of using the exhaust gas from the turbine and low grade waste heat enables a much more compact, cost effective device to be designed without the need for a large number of ambient vaporisers. Using the exhaust gas to evaporate the cryogen removes the requirement for very low temperature heat transfer fluids for this stage of the process, hence improving the overall cost effectiveness of the system. Furthermore the final exhaust gas from the system, at exit from the evaporator, is at very low temperature, typically less than 10° C. higher than the high pressure cryogenic liquid, and can be exhausted to atmosphere or used in a co-located process that requires cold energy, such as a refrigeration or air conditioning system.

BRIEF DESCRIPTION OF THE DRAWINGS

Embodiments of the present invention will now be described with reference to the figures in which.

DETAILED DESCRIPTION OF THE DRAWINGS

Figure 1:
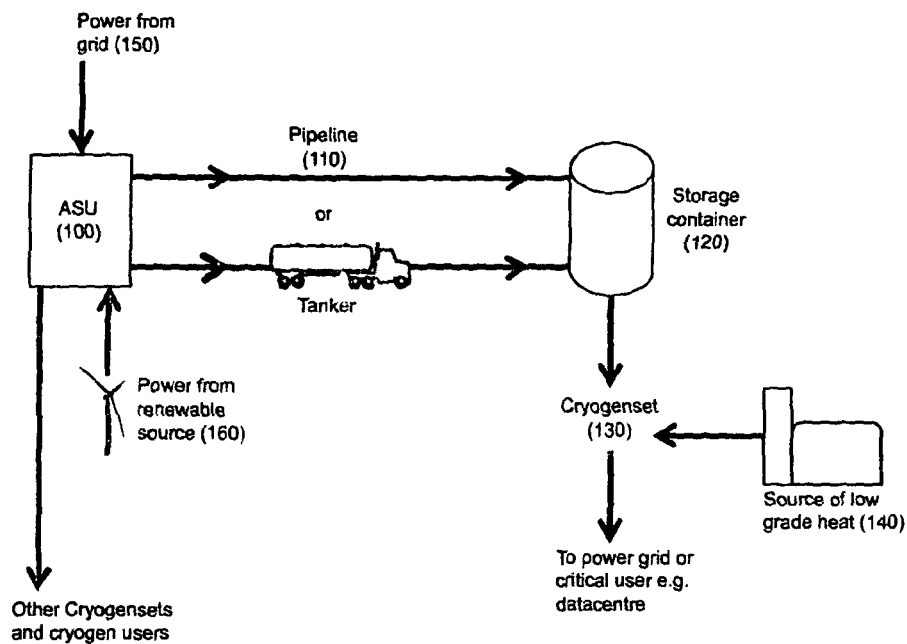
FIG. 1 shows the concept of the cryogenset of the present invention in relation to a supply of cryogenic fluid from a refrigeration plant and integration with a source of low grade waste heat.

The concept of the cryogenset electricity generation system of the present invention is shown in FIG. 1. Cryogenic liquid is manufactured at the industrial refrigeration plant or air separation unit (ASU) 100 and transferred by tanker or pipeline 110 to the storage container 120 local to the cryogenset. When electricity is required to support the grid or network or provide back-up supplies, the cryogenic liquid is released from the storage container to the cryogenset 130, to generate electricity to meet demand. The cryogenset is located close to a source of low grade waste heat (typically 20° C. to 150° C.) 140, which is used to improve the efficiency of the system as described in the following embodiments. The power for the ASU 100 can be supplied from the electricity distribution grid or network 150, from one or more of fossil fuel, nuclear and renewable power stations and/or from a connection to a renewable generation plant 160, such as a wind turbine.

The elements comprising different embodiments of the cryogenset 130 are now described with reference to FIGS. 2-4.

Figure 2:
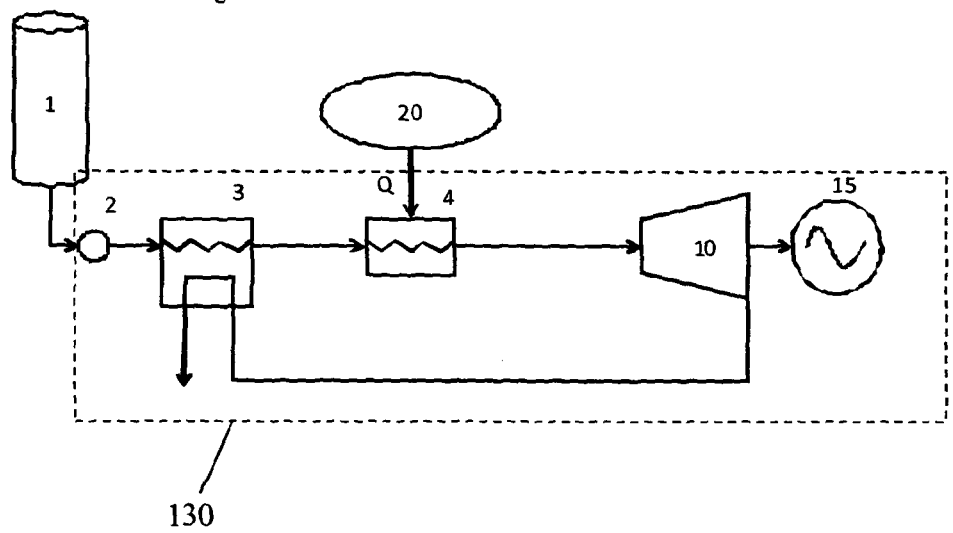
FIG. 2 shows a cryogenset according to the present invention with a single turbine stage.

In a first embodiment of the present invention shown in FIG. 2, cryogenic liquid is received from at least one storage tank 1 and compressed to high pressure, typically greater than 70 bar but less than 200 bar, by at least one liquid pump 2. The high pressure liquid is then evaporated using an evaporator 3 which is connected, on the heating side, to the exhaust of an expansion turbine 10. The now gaseous high pressure fluid is then further heated by another heat exchanger (referred to as the superheater) 4 using heat, Q, from a source, or sources, of low grade heat 20, such as a thermal power station or industrial process. The gas is then expanded through the expansion turbine 10 to generate motive power which in turn drives a generator 15 to produce electricity. The low pressure exhaust gas from the turbine, which is at or slightly above atmospheric pressure (typically 1 to 2 bar), is then returned to the evaporator 3 to evaporate more of the incoming high pressure cryogenic liquid. The final exhaust gas from the system is at a very low temperature, typically less than 10° C. higher than the high pressure cryogenic liquid, or −170° C. to −150° C., and can be either exhausted to atmosphere or used in a co-located process that requires cold energy such as a refrigeration or air conditioning system.

Figure 3:
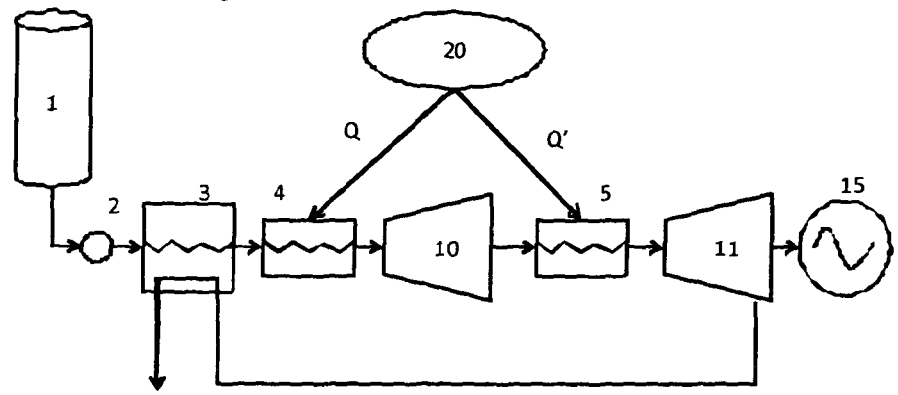
FIG. 3 shows a second embodiment of a cryogenset according to the present invention incorporating a second turbine stage to improve efficiency.

In a second embodiment of the invention as shown in FIG. 3, the high pressure gas is expanded in two turbine stages 10, 11 to improve the efficiency of the process. Although two stages 10, 11 are shown in FIG. 3, more than two turbine stages can be used. The efficiency is further improved by reheating the part expanded gas between each turbine stage using another heat exchanger, (referred to as a reheater) 5 and low grade waste heat, Q', from at least one source of waste heat 20. In all other respects the system of FIG. 3 is the same as that of FIG. 2. The source of waste heat 20 used in the reheater 5 may be the same source or a different source to that used in the superheater 4. The low pressure exhaust gas from the final turbine stage 11 is then returned to the evaporator 3 to evaporate the incoming high pressure cryogenic liquid.

When the source of low grade waste heat 20 is at a temperature above 150° C., there are few cost effective heat transfer fluids that can operate at a sufficiently high temperature and do not freeze at the low temperatures encountered in the superheater 4. For example, many low temperature hydrocarbon based heat transfer fluids can only operate between −120° C. and 160° C. Examples of such low temperature heat transfer fluids are those traded under the brand names Dynalene MV, Paratherm CR. The heat transfer fluid would degrade significantly if the heat source was, for example, the exhaust of a gas turbine or diesel engine. High temperature heat transfer fluids that can operate at temperatures over 200° C. will become very viscous and even freeze if used below −30° C. An example of such a high temperature heat transfer fluid is that traded under the brand name Marlotherm LH.

Figure 4:
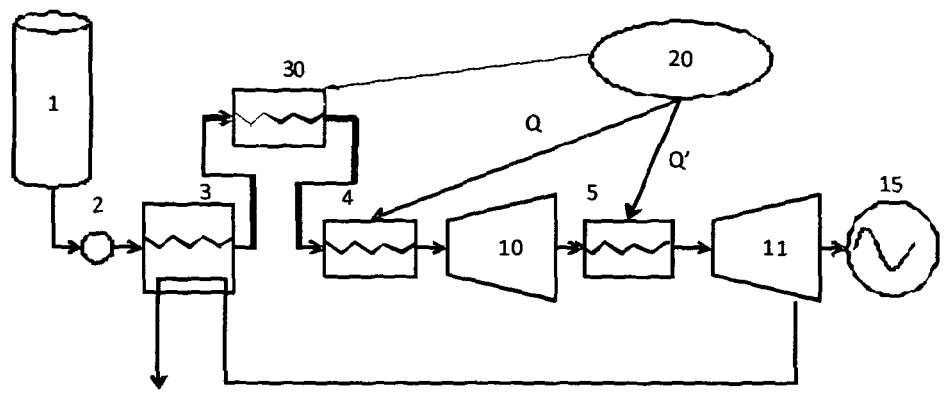
FIG. 4 shows a third embodiment of a cryogenset according to the present invention that utilises an additional heat transfer fluid circuit.

For these cases, in a further embodiment of the invention as shown in FIG. 4, an additional heat exchanger (referred to as the main heater) 30 may be added before the superheater 4 that enables two different heat transfer fluids to be used, otherwise the system of FIG. 4 is the same as that of FIG. 3. A first heat transfer fluid, which can operate at a low temperature, is used to provide the first stage of heating in the main heat exchanger 30. A second heat transfer fluid, which operates at a higher temperature than the first heat transfer fluid, but may freeze if used directly in the main heat exchanger 30, is used in the superheater 4 and reheater 5 between turbine stages 10, 11. The first heat transfer fluid can be heated directly from one of the at least one sources of waste heat 20 if the temperature is not too high, or otherwise indirectly using the second heat transfer fluid (not shown in FIG. 4).

The present inventors have identified a number of power generation processes that produce various grades of waste heat that could be used with the cryogenset of the present invention. Some examples are summarised in Table 1.

TABLE 1

Examples of Sources of Waste Heat

| Source | Location | Temperature |
|---|---|---|
| Diesel or gas engine exhaust | Exhaust | 400° C. to 600° C. |
| | Jacket cooling water | 70° C. to 90° C. |
| Open Cycle Gas Turbine | Exhaust | 450° C. to 550° C. |
| | Ancillary cooling water | 40° C. to 60° C. |
| Combine Cycle Gas Turbine | Exhaust | 100° C. to 140° C. |
| | Condensate Water | 20° C. to 50° C. |
| Refuse Incinerator | Exhaust Gas | 450° C. to 600° C. |
| | Condensate Water (often used for district heating) | 60° C. to 100° C. |

Figure 5:
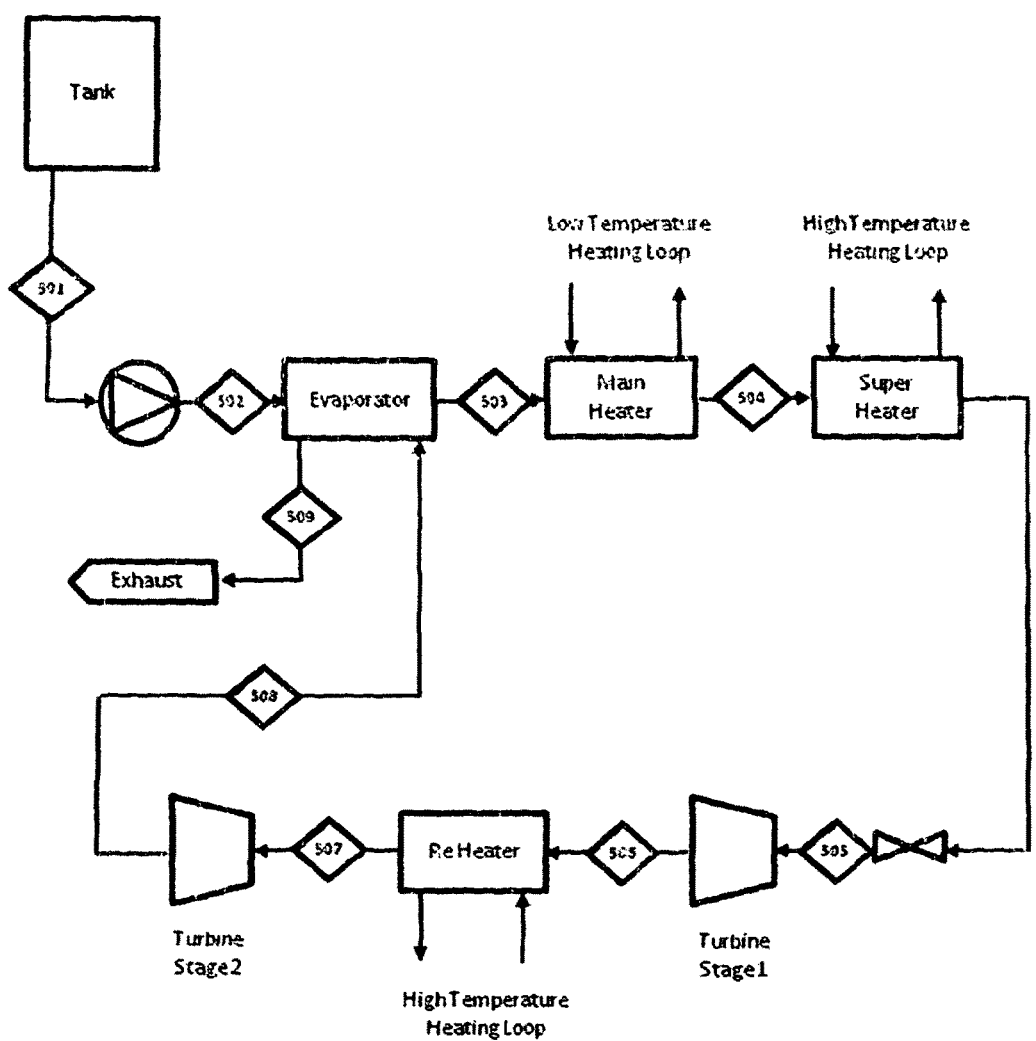
FIG. 5 shows a fourth, preferred embodiment of a cryogenset according to the present invention.

A preferred embodiment of the cryogenset is a two stage turbine integrated with a source of waste heat of 200° C. to 250° C., supplied from a waste incinerator, gas turbine or gas engine exhaust. The inventors have found that two stage turbines are readily available whereas more stages would require a bespoke design. In addition, current cryogenic pumps are limited to 100 bar pressure and so the benefits of more than two turbine stages are small without moving to a higher pressure which would require the development of a new cryogenic pump. A typical process flow diagram for the two stage configuration is shown in FIG. 5 and typical pressures and temperatures for a 3 to 4 MW machine are shown in Table 2. Both a high and low temperature heating loop are used, as discussed with respect to FIG. 4, with two different heat transfer media to ensure compatibility between the heat transfer fluids and the heat exchanger surface temperatures. In the preferred embodiment, the main heater inlet is −93° C. and high temperature heat transfer fluids are more likely to be excessively viscous or freeze if used to heat this heat exchanger. The reference numerals used in FIG. 5 correspond to the components and stages given in Table 2.

TABLE 2

Process Flow Table

| | Process Temperatures, Pressures and Flows | Pressure Bar abs | Temperature deg C. |
|---|---|---|---|
| 501 | Storage Tank | 5.0 | −177 |
| 502 | Evaporator Inlet | 97.0 | −170 |
| 503 | Main Heater Inlet | 96.8 | −93 |
| 504 | Superheater Inlet | 96.5 | 20 |
| 505 | Stage 1 Turbine Inlet | 95.0 | 227 |
| 506 | Stage 1 Turbine Outlet | 12.0 | 42 |
| 507 | Stage 2 Turbine Inlet | 12.0 | 227 |
| 508 | Stage 2 Turbine Outlet | 1.2 | 19 |
| 509 | Exhaust | 1.0 | −168 |

The present invention has been described above purely by way of example. It should be noted, however, that modifications in detail can been made within the scope of the invention as defined in the claims appended hereto.

The invention claimed is:

1. An electricity generation system comprising an electricity generation device and a source of waste heat from at least one process outside the electricity generation device; wherein the electricity generation device comprises:
a storage tank for storing a cryogenic fluid, wherein the cryogenic fluid is liquid nitrogen or liquid air,
a fluid pump for compressing cryogenic fluid taken from the storage tank to provide a high pressure cryogenic fluid,
an evaporator for evaporating the high pressure cryogenic fluid, to provide a high pressure gas,
a superheater for heating the high pressure gas to a high temperature, to provide a superheated high pressure gas;
an expansion turbine for expanding and extracting work from the superheated high pressure gas and generating a low pressure exhaust; and
an electric generator configured to be driven by rotational energy produced by the expansion turbine to produce electricity;
wherein the evaporator is configured for evaporating the high pressure cryogenic fluid using the low pressure exhaust from the expansion turbine;
and further comprising a main heater, wherein the main heater and the superheater are configured and arranged for using the source of waste heat from at least one process outside the electricity generation device to heat the high pressure gas from the evaporator to a high temperature in two stages, wherein a first heat transfer media is arranged to transfer heat from the source of waste heat from at least one process outside the electricity generation device to the main heater, and a second heat transfer media different from the first heat transfer media is arranged to transfer heat from the source of waste heat from at least one process outside the electricity generation device to the superheater, and wherein the source of waste heat from at least one process outside the electricity generation device comprises at least one process in a thermal power station, industrial process, waste incinerator, gas turbine, gas engine or diesel engine that is outside the electricity generation device; and
wherein a final exhaust emitted from the evaporator, including the low pressure exhaust from the expansion turbine, is emitted from the electricity generation device.

2. The electricity generation system of claim 1, wherein the electricity generation device is connected to an electricity generation network to provide at least one grid support service.

3. The electricity generating system of claim 1, wherein the expansion turbine comprises a multi stage turbine, and further comprising a re-heater arranged between each stage of the multi-stage turbine to heat a cooled exhaust from a previous stage of the turbine before the cooled exhaust enters a next turbine stage.

4. The electricity generation system of claim 1, wherein the final exhaust emitted from the evaporator is further configured to provide cold energy in a process that is outside the electricity generation device and that requires cold energy.

5. A method of generating electricity using an electricity generation device comprising a storage tank, a fluid pump, an evaporator, a main heater, a superheater, an expansion turbine and an electric generator, the method comprising:
storing a cryogenic fluid in the storage tank of the electricity generation device, wherein the cryogenic fluid is liquid nitrogen or liquid air;
extracting the cryogenic fluid from the storage tank and compressing the cryogenic fluid to provide a high pressure cryogenic fluid using the fluid pump;

evaporating the high pressure cryogenic fluid in the evaporator using a low pressure exhaust of the expansion turbine to provide a high pressure gas;

heating the high pressure gas from the evaporator to a high temperature to provide a superheated high pressure gas using the main heater and the superheater and a source of waste heat from at least one process in a thermal power station, industrial process, waste incinerator, gas turbine, gas engine or diesel engine that is outside the electricity generation device;

wherein the high pressure gas is heated during a first stage using the main heater using waste heat from at least one process in a thermal power station, industrial process, waste incinerator, gas turbine, gas engine or diesel engine that is outside the electricity generation device, and the high pressure gas is heated during a second stage using the superheater using waste heat from at least one process in a thermal power station, industrial process, waste incinerator, gas turbine, gas engine or diesel engine that is outside the electricity generation device, and wherein energy is transferred to the main heater during the first stage using a first heat transfer media, and energy is transferred to the superheater during the second stage using a second heat transfer media different from the first heat transfer media;

expanding the superheated high pressure gas using the expansion turbine to generate the low pressure exhaust;

extracting work from the superheated high pressure gas to drive the electric generator and produce electricity from rotational energy produced by the expansion turbine; and emitting a final exhaust emitted from the evaporator, including the low pressure exhaust from the expansion turbine, from the electricity generation device.

6. The method of claim 5, wherein the source of waste heat used to heat the high pressure gas is from at least one process in a thermal power station, waste incinerator, gas turbine, gas engine or diesel engine that is outside the electricity generation device.

7. The method of claim 5, further comprising: supplying the electricity produced by the generator to an electricity distribution grid to provide at least one grid support service.

8. The method of claim 7 wherein the at least one grid support service comprises at least one of:

(a) balancing differences in supply and demand at different times of day;
(b) balancing differences in supply and demand at short notice;
(c) injecting electricity into the grid to support frequency when demand is increasing rapidly;
(d) providing black start support; and
(e) providing electricity distribution grid re-enforcement when parts of the electricity distribution grid have a shortfall in capacity during periods of high power demand.

9. The method of claim 5, further comprising: using the generated electricity to provide back-up power.

10. The method of claim 5, wherein the step of expanding the superheated high pressure gas comprises expanding the gas in a multi-stage turbine by:

expanding the gas in a first stage of the multi-stage turbine;
heating the exhaust gas from the first stage of the multi-stage turbine with a re-heater; and
expanding the exhaust gas from the re-heater in a second stage of the multi-stage turbine.

11. The method of claim 5, further comprising extracting cold energy from the final exhaust of the evaporator, and using the extracted cold energy in a process that is outside the electricity generation device and that requires cold energy.

12. The electricity generation system of claim 1, wherein the source of waste heat used by the superheater is from at least one process in a thermal power station, waste incinerator, gas turbine, gas engine or diesel engine that is outside the electricity generation device.

13. The electricity generation system of claim 4, wherein the process that is outside the electricity generation device and that requires cold energy is a refrigeration or air conditioning system.

14. The electricity generation system of claim 1, wherein the final exhaust emitted from the evaporator is configured to be exhausted to the atmosphere.

15. The method of claim 11, wherein the process that is outside the electricity generation device and that requires cold energy is a refrigeration or air conditioning system.

16. The method of claim 5, wherein the final exhaust emitted from the evaporator is exhausted to the atmosphere.

* * * * *